(12) United States Patent
Mori

(10) Patent No.: US 7,555,141 B2
(45) Date of Patent: Jun. 30, 2009

(54) VIDEO PHONE

(75) Inventor: Kunihiko Mori, Shizuoka (JP)

(73) Assignee: NEC Corporation, Tokyo (JP)

( * ) Notice: Subject to any disclaimer, the term of this patent is extended or adjusted under 35 U.S.C. 154(b) by 761 days.

(21) Appl. No.: 11/268,633

(22) Filed: Nov. 8, 2005

(65) Prior Publication Data

US 2006/0126894 A1 Jun. 15, 2006

(30) Foreign Application Priority Data

Nov. 9, 2004 (JP) ............................. 2004-324721

(51) Int. Cl.
*G06K 9/00* (2006.01)
*H04N 7/14* (2006.01)
*H04N 7/16* (2006.01)
*H04W 4/10* (2006.01)

(52) U.S. Cl. ................. 382/103; 348/14.01; 455/422.1; 725/62

(58) Field of Classification Search ................. 382/103, 382/115, 116, 117, 118; 348/14.01, 169, 348/170, 171, 172, 739; 380/247, 257; 375/240.01; 455/400, 403, 422.1, 426.1, 439, 560; 725/62, 725/99, 106, 113, 122
See application file for complete search history.

(56) References Cited

U.S. PATENT DOCUMENTS 5,631,697 A * 5/1997 Nishimura et al. .......... 348/172

FOREIGN PATENT DOCUMENTS

CN 1370387 9/2002

(Continued)

OTHER PUBLICATIONS

Japanese Office Action dated Feb. 19, 2008 with Partial English Translation.

(Continued)

*Primary Examiner*—Abolfazl Tabatabai
(74) *Attorney, Agent, or Firm*—McGinn IP Law Group, PLLC

(57) ABSTRACT

A video phone includes an image sensing unit, face detection unit, image sensing adjustment unit, and communication control unit. The image sensing unit senses the face of a user serving as an object and generates image information. The image sensing unit has enlargement and reduction functions for the object in the image sensing range. The face detection unit detects the user's face from the image information generated by the image sensing unit. The image sensing adjustment unit sets, in the image information generated by the image sensing unit, a core area which has redundancy and contains a face area serving as an area corresponding to the face detected by the face detection unit. The image sensing adjustment unit controls the image sensing unit, and generates image information by performing at least one of enlargement and reduction processes on the core area under a predetermined condition. The communication control unit transmits the image information generated by the image sensing adjustment unit to a communication partner.

15 Claims, 14 Drawing Sheets

FOREIGN PATENT DOCUMENTS

| | | |
|---|---|---|
| EP | 1 158 786 A2 | 5/2001 |
| EP | 1 202 603 | 5/2002 |
| JP | 2-119390 | 5/1990 |
| JP | 2000-99691 | 4/2000 |
| JP | 2001-268533 | 9/2001 |
| JP | 2002-165192 | 6/2002 |
| JP | 2003-230049 | 8/2003 |
| JP | 2004-40491 | 2/2004 |
| JP | 2004-187140 | 7/2004 |
| WO | WO 02/37179 A2 | 5/2002 |

OTHER PUBLICATIONS

European Search Report dated Apr. 20, 2006.
Chinese Office Action dated Apr. 25, 2008 with English translation.
Japanese Office Action dated Mar. 17, 2009 with Partial English-Language Translation.

* cited by examiner

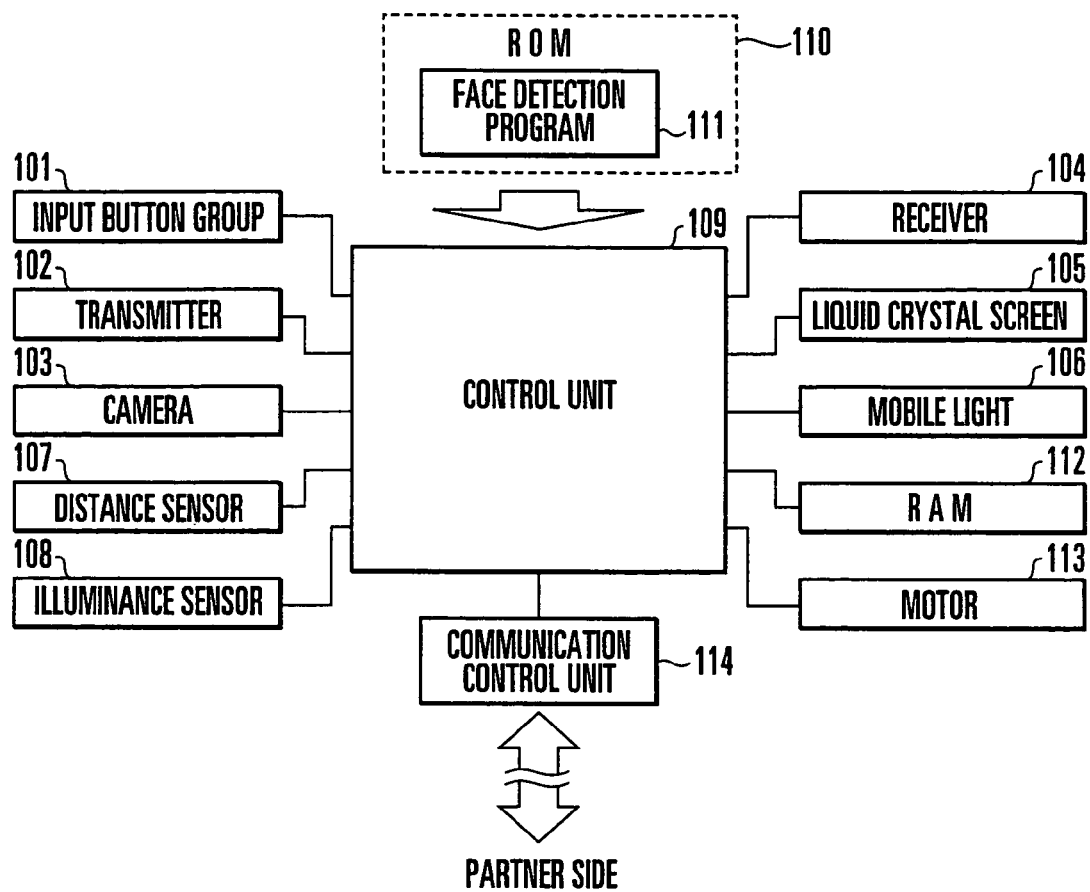
F I G. 2
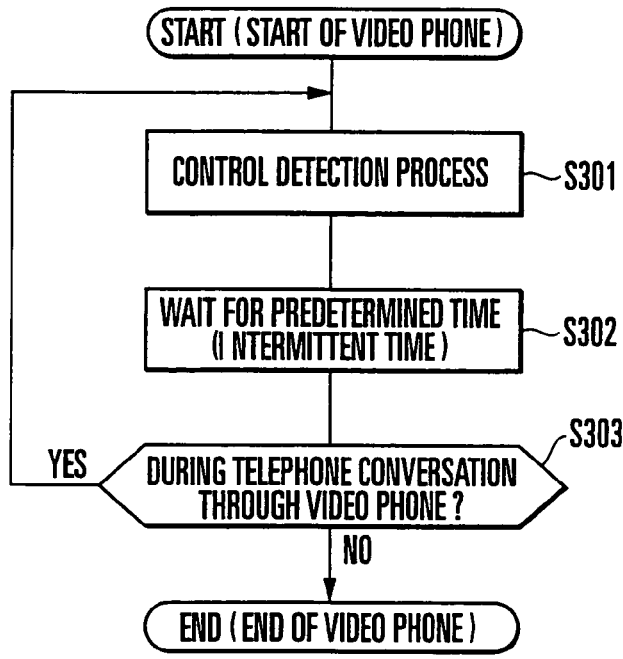
F I G. 3

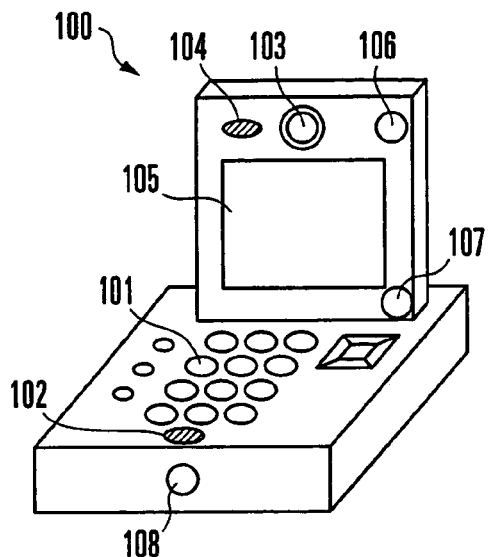
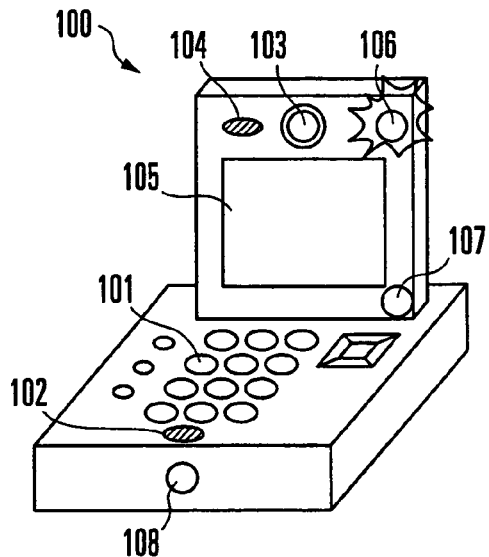
FIG.15A        FIG.15B
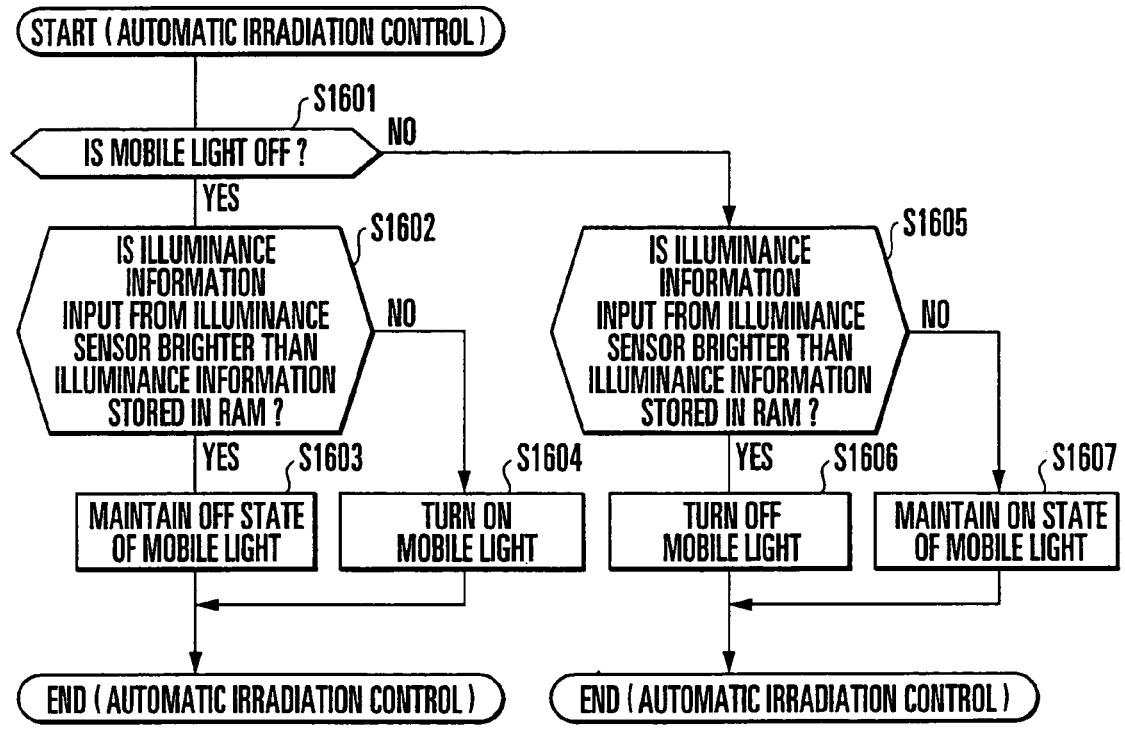
FIG. 16

VIDEO PHONE

BACKGROUND OF THE INVENTION

The present invention relates to a video phone which adjusts an image display, volume output, and illumination lighting.

To display the user's face at a proper size on the display of the partner's video phone during telephone conversation with the partner through the video phone, the distance between the user's face and a camera attached to the video phone must be kept constant.

A volume output from the loudspeaker is kept constant regardless of the distance between the user and the video phone. To listen to the partner's voice at an appropriate volume, the user must manually adjust the volume.

When the user's environment is dark, the image of the user that is transmitted to the partner's video phone becomes dark. Reference 1 (Japanese Patent Laid-Open No. 2002-165192) discloses a video phone apparatus which always generates proper video information regardless of the peripheral brightness of an object, and always effectively operates the video transmitting function. The object is illuminated by emitting light from an "infrared LED" in the image sensing range of a camera. However, cost performance decreases when the infrared LED is mounted on a cell phone having the video phone function. The design may be impaired in consideration of the balance with another part which forms the video phone apparatus.

Reference 2 (Japanese Patent Laid-Open No. 2-119390) discloses a video phone set which can take a picture at a contrast improved for a higher brightness even when a picture is taken in a dark room or an object to be photographed is illuminated from behind, and can synchronize illumination with the use of the video phone set. However, as shown in FIG. 2 of reference 2, the illumination unit of the video phone set targets a very wide range, and cost performance decreases. The design may be impaired in consideration of the balance with another part which forms the video phone set.

Reference 3 (Japanese Patent Laid-Open No. 2004-40491) discloses a video communication equipment capable of improving usability. The contour of the face of a user to be photographed is determined via a CCD camera in accordance with the image sensing distance. The zoom ratio is automatically controlled on the basis of the determined contour so that the user's face falls within the view angle of the CCD camera. The user's face is displayed at an optimal size on the display. The reference volume output level is increased in accordance with the automatically changed zoom ratio, and an optimal image desirable for the communication partner can be obtained.

However, the method of displaying the user's face at an optimal size is not limited to determination of the face contour. For a display at an optimal size, it is more important to adjust the zoom ratio and properly display the user's face, than to determine the face. Considering matching with the user's face displayed on the display, the volume output is preferably adjusted on the basis of the distance between the camera and the user, instead of the zoom ratio.

Reference 4 (Japanese Patent Laid-Open No. 2003-230049) discloses a camera control method and the like which employ a smaller number of audio input units and can eliminate the influence of peripheral echo and display an accurate face image of a speaker on the screen. The face image of the speaker is automatically adjusted to an appropriate size by zooming. Reference 4 pertains to an invention of a camera used in a video conference system. In order to photograph a speaker, the orientation and position of the camera can be properly changed. When the camera is mounted on a video phone, cost performance decreases. For a display at an optimal size, it is more important to adjust the zoom ratio and properly display the user's face, than to detect a face image.

SUMMARY OF THE INVENTION

The present invention has been made to overcome the conventional drawbacks, and has as its object to provide a video phone which properly displays a user's face while suppressing a decrease in cost performance.

According to the present invention, there is provided a video phone comprising image sensing means for sensing a face of a user serving as an object and generating image information, the image sensing means having an enlargement function and a reduction function for the object in an image sensing range, face detection means for detecting the face of the user from the image information generated by the image sensing means, image sensing adjustment means for setting, in the image information generated by the image sensing means, a core area which has redundancy and contains a face area serving as an area corresponding to the face detected by the face detection means, controlling the image sensing means, and generating image information by performing at least one of an enlargement process and a reduction process on the core area under a predetermined condition, and communication control means for transmitting the image information generated by the image sensing adjustment means to a communication partner.

BRIEF DESCRIPTION OF THE DRAWINGS

FIG. 2 is a block diagram showing components, elements, and the like which form the video phone shown in FIG. 1;

FIG. 3 is a flowchart showing process operation during telephone conversation in the use of the video phone shown in FIG. 1;

FIG. 7A is a view showing an object image displayed on the liquid crystal screen before an image photographed by a camera is zoomed in;

FIG. 7B is a view showing an object image displayed on the liquid crystal screen after the image photographed by the camera is zoomed in;

FIG. 15A is a perspective view showing the OFF state of a mobile light;

FIG. 15B is a perspective view showing the ON state of the mobile light;

FIG. 16 is a flowchart showing another automatic irradiation control;

DESCRIPTION OF THE PREFERRED EMBODIMENT

A video phone according to an embodiment of the present invention will be described in detail below with reference to the accompanying drawings.

Figure 1:
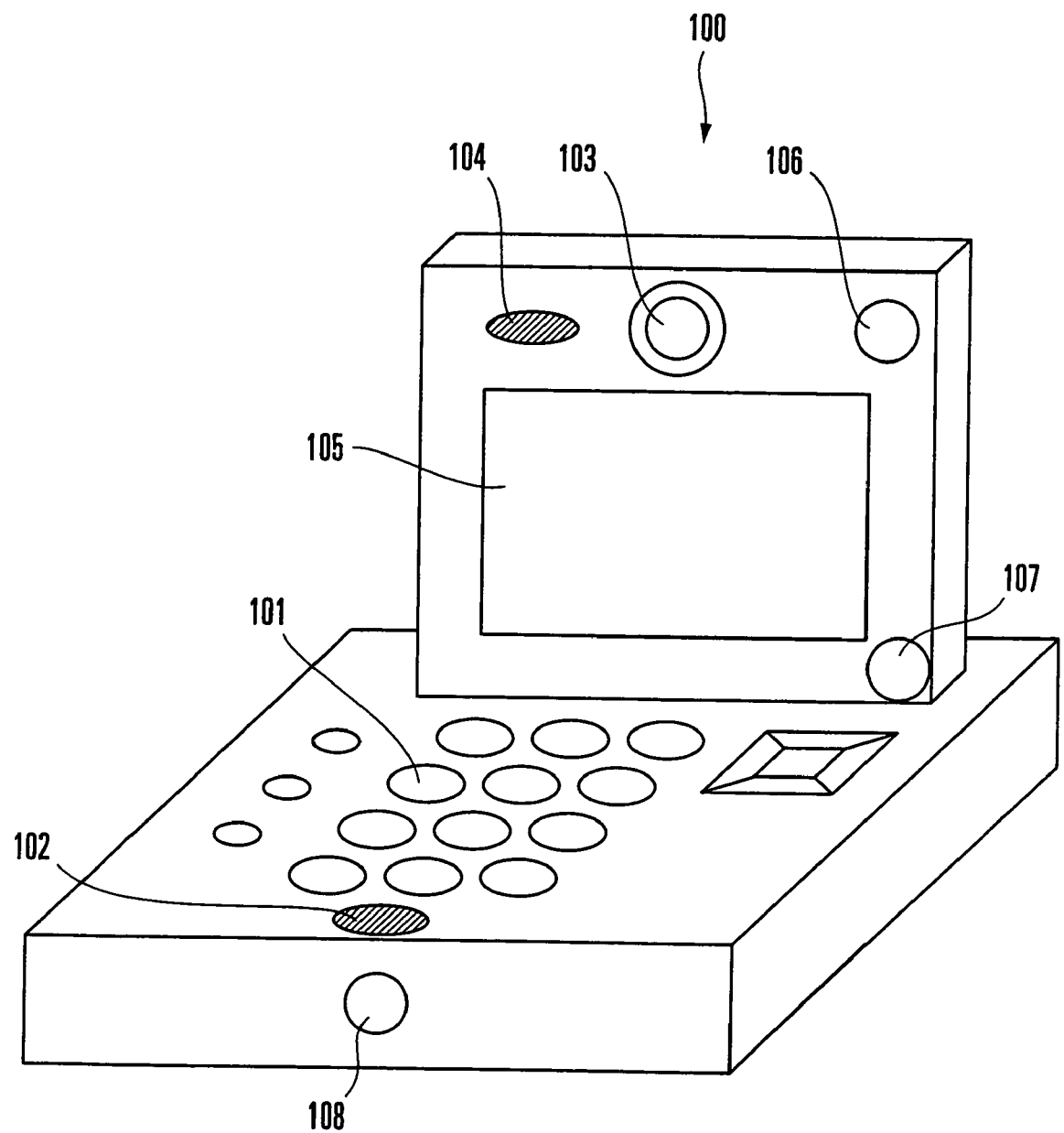
FIG. 1 is a perspective view showing the appearance of a video phone according to an embodiment of the present invention.

As shown in FIG. 1, the appearance of a video phone 100 according to the embodiment comprises an input button group 101, transmitter 102, camera 103, receiver 104, liquid crystal screen 105, mobile light 106, distance sensor 107, and illuminance sensor 108.

The input button group 101 includes buttons for setting figures, signs, and characters (e.g., alphabets), and buttons for setting predetermined control. The input button group 101 is used before telephone conversation, and if necessary, during telephone conversation. The input button group 101 functions as an input unit which accepts, e.g., an input for displaying an image based on image information generated by a control unit 109 (to be described later) on the liquid crystal screen 105, and an input for adjusting the volume of a sound output from the receiver 104.

The transmitter 102 is a component which receives the user's voice. The user brings his mouse close to the transmitter 102 and speaks something necessary. By a predetermined setting, the user can also input an uttered voice to the transmitter 102 at a position away from the video phone 100.

The camera 103 is an image sensing means which has a zoom function and performs an image sensing process. The camera 103 is so located as to sense an object, mainly the user's face. The camera 103 senses the user's face and generates image information. The zoom function means enlargement and reduction functions for an object in the photographing range of the camera 103. The zoom function is a hardware zoom (e.g., an optical zoom), a software zoom (e.g., a digital zoom), or a proper combination of them.

The receiver 104 is a component which outputs the voice of the partner, and functions as an audio output unit. The user brings his ear close to the receiver 104 and listens to a talk of the partner. By a predetermined setting, the user can also listen to a partner's talk output from the receiver 104 at a position away from the video phone 100. The receiver 104 functions as a notification unit which notifies the user that an abnormal state has been detected.

The liquid crystal screen 105 is a display which is formed from a liquid crystal. The liquid crystal screen 105 functions as an image display unit which displays an image based on image information generated by the control unit 109 (to be described later). During telephone conversation, the liquid crystal screen 105 displays the partner's face sensed by the camera 103. In order to set parameters on telephone conversation in accordance with a predetermined input, the liquid crystal screen 105 also displays a window for accepting input of the setting. The liquid crystal screen 105 functions as a notification unit which notifies the user that an abnormal state has been detected.

The mobile light 106 is an illumination component which is arranged at a position where the mobile light 106 can appropriately illuminate the user's face and has low cost performance. The mobile light 106 is controlled to be turned on/off in accordance with the brightness of the user's environment.

The distance sensor 107 is a component which is so arranged as to measure the distance between the user's face and the video phone 100, and functions as a distance detection unit. The illuminance sensor 108 is a component which is so arranged as to measure the illuminance of the user's face, and functions as an illuminance detection unit.

As shown in FIG. 2, the video phone 100 comprises the control unit 109, a ROM (Read Only Memory) 110, a RAM (Random Access Memory) 112, a motor 113, and a communication control unit 114 in addition to the above-described input button group 101, transmitter 102, camera 103, receiver 104, liquid crystal screen 105, mobile light 106, distance sensor 107, and illuminance sensor 108.

The control unit 109 is an element which comprehensively controls processes on information such as audio information and image information input from the transmitter 102, camera 103, and the like, and information output to the receiver 104, liquid crystal screen 105, and the like. The ROM 110 is a storage medium which stores predetermined programs for executing processes by the control unit 109. The programs include a face detection program 111. The control unit 109 reads out the face detection program 111 from the ROM 110, and detects a user's face to be sensed in an image sensing process by the camera 103. The detection method is a known method of detecting the contour of the user's face or part of the face (e.g., nose or mouse).

The RAM 112 is an element which temporarily stores predetermined information input/output to/from the video phone 100. The RAM 112 stores information on the telephone number of a partner, and image information on the image of the user's face that is obtained by an image sensing process by the camera 103. The RAM 112 also stores another information.

The motor 113 is a component which is driven to vibrate the entire video phone 100 when a predetermined condition is satisfied, and functions as a vibration generation unit. The motor 113 functions as a notification unit which notifies the user that an abnormal state has been detected.

The communication control unit 114 has a function of controlling transmission/reception of image information, audio information, and another information on communication. For example, the communication control unit 114 transmits image information generated by the control unit 109 to the partner's video phone. By using a predetermined interface, the communication control unit 114 can control communication with the partner's video phone wirelessly or by wire.

Process operation by the video phone 100 according to the embodiment will be explained.

<Process Operation During Telephone Conversation>

Process operation during telephone conversation in the use of the video phone 100 will be explained with reference to the flowchart of FIG. 3.

After a partner's telephone number is input and telephone conversation starts, detection process control is performed (S301). Detection process control includes "automatic face detection control" and "camera photographing adjustment control", which are sequentially executed. The two control operations will be described later.

Information on the intermittent time that is stored in the RAM 112 is read out, and the process waits for the intermittent time without performing detection process control (S302).

If the telephone conversation continues even upon the lapse of the intermittent time, the process is repeated. If the telephone conversation has ended, process operation during the telephone conversation ends (S303).

<Automatic Face Detection Control>

Figure 4:
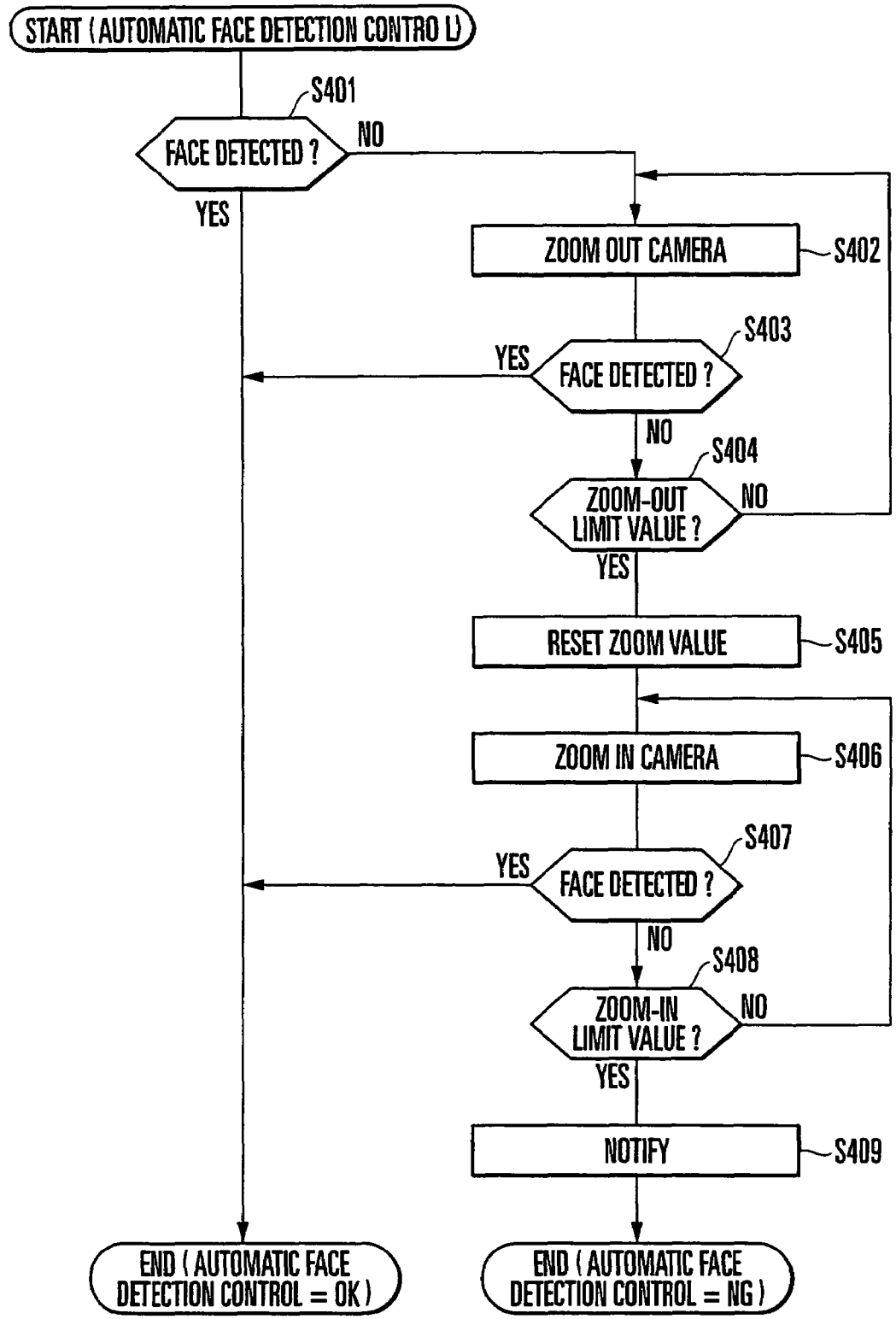
FIG. 4 is a flowchart showing automatic face detection control.

Automatic face detection control will be explained with reference to the flowchart of FIG. 4.

The control unit 109 executes the face detection program 111 stored in the ROM 110, and detects a user's face from an image photographed by the camera 103 (S401). If the control unit 109 detects the face (YES in S401), automatic face detection control ends.

If the control unit cannot detect any user's face (NO in S401), the control unit 109 zooms out the camera 103 used in the video phone (S402).

The control unit 109 executes the face detection program 111 stored in the ROM 110, and detects a user's face from an image photographed by the camera 103 (S403). If the control unit 109 detects the face (YES in S403), automatic face detection control ends.

If the control unit 109 cannot detect any face (NO in S403), the control unit 109 checks whether the zoom-out value of the camera 103 is an upper limit value (S404). If the zoom-out value is not an upper limit value (NO in S404), the control unit 109 zooms out the camera 103 (S402).

If the zoom-out value of the camera is an upper limit value (YES in S404), the control unit 109 resets the zoom value of the camera 103 (S405). "Reset" means to return the zoom value of the camera to one in S401.

The control unit 109 zooms in the camera 103 used in the video phone (S406).

The control unit 109 executes the face detection program 111 stored in the ROM 110, and detects a user's face from an image photographed by the camera 103 (S407). If the control unit 109 detects the face (YES in S407), automatic face detection control ends.

If the control unit cannot detect any face (NO in S407), the control unit 109 checks whether the zoom-in value of the camera 103 is an upper limit value (S408). If the zoom-in value is not an upper limit value (NO in S408), the control unit 109 zooms in the camera 103 (S406).

If the zoom-in value of the camera 103 is an upper limit value (YES in S408), the control unit 109 uses display on the liquid crystal screen 105, a sound output from the receiver 104, rumbling by vibrations of the motor 113, or the like, and notifies the user that the control unit 109 cannot detect any user's face (S409). The notification ends when the image state is properly changed, an arbitrary button of the input button group 101 is pressed, or a predetermined time is elapsed.

After that, automatic face detection control ends, and camera photographing adjustment control is executed.

<Camera Photographing Adjustment Control>

Figure 5:
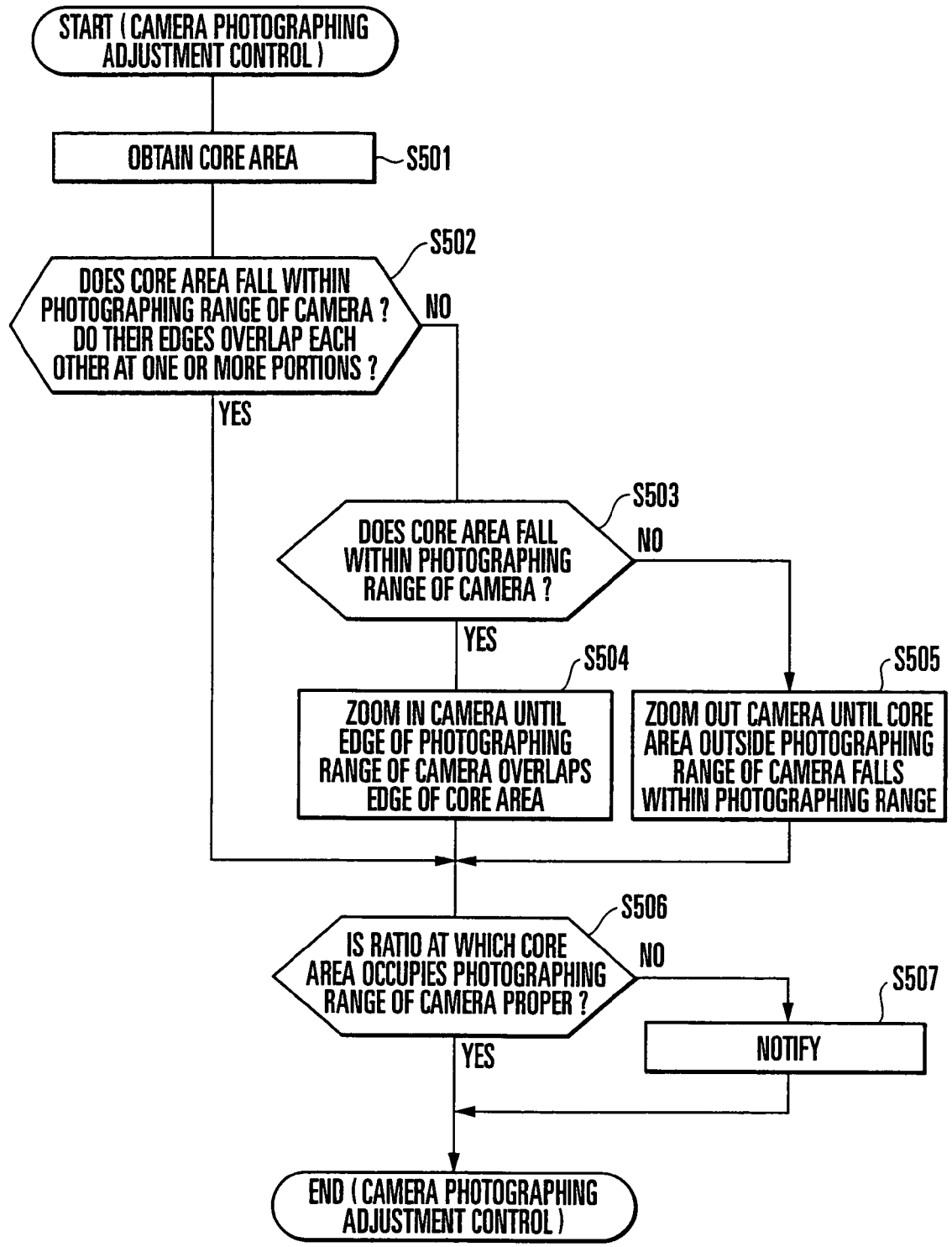
FIG. 5 is a flowchart showing camera photographing adjustment control.

Camera photographing adjustment control will be described with reference to the flowchart of FIG. 5. Camera photographing adjustment control is executed only when a face can be detected by automatic face detection control, and is not executed when no face can be detected.

For descriptive convenience, terms will be defined. A "face area" is an area corresponding to a face detected by automatic face detection control. A "core area" is an area prepared by properly adding a redundant area around the face area. Although the shape of the core area is arbitrary, the core area will be explained as a rectangular area for descriptive convenience.

Figure 6A:
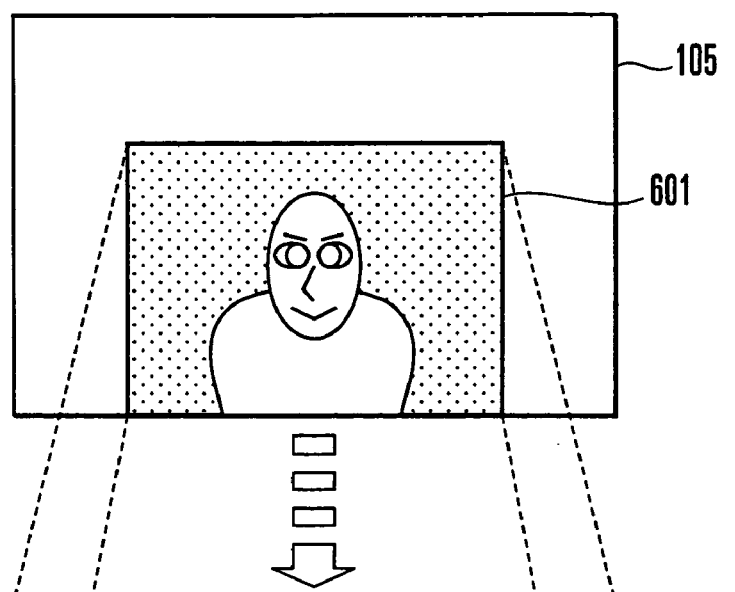
FIG. 6A is a view showing an object image displayed on a liquid crystal screen before camera photographing adjustment control is performed.
Figure 6B:
FIG. 6B is a view showing an object image displayed on the liquid crystal screen after camera photographing adjustment control is performed.

The control unit 109 obtains a core area (S501). How to obtain a core area is shown in FIGS. 6A and 6B. FIGS. 6A and 6B show object images displayed on the liquid crystal screen 105. FIG. 6A shows an image before camera photographing adjustment control is performed, and FIG. 6B shows an image after camera photographing adjustment control is performed. The image of the core area is illustrated in FIGS. 6A and 6B for convenience, but is not displayed on the liquid crystal screen 105 during actual telephone conversation. In camera photographing adjustment control, when a core area 601 exists at the center of the view angle of the camera, it is enlarged to the full view angle, as represented by a core area 602. Even when the core area does not exist at the center, it is appropriately changed.

The control unit 109 detects whether the core area falls within the photographing range of the camera 103 and their edges overlap each other at one or more portions (S502).

If the core area does not fall within the photographing range of the camera, or if the core area falls within the photographing range of the camera but their edges do not overlap each other at any portion (NO in S502), the control unit 109 detects which of these states occurs (S503).

Figure 7A:
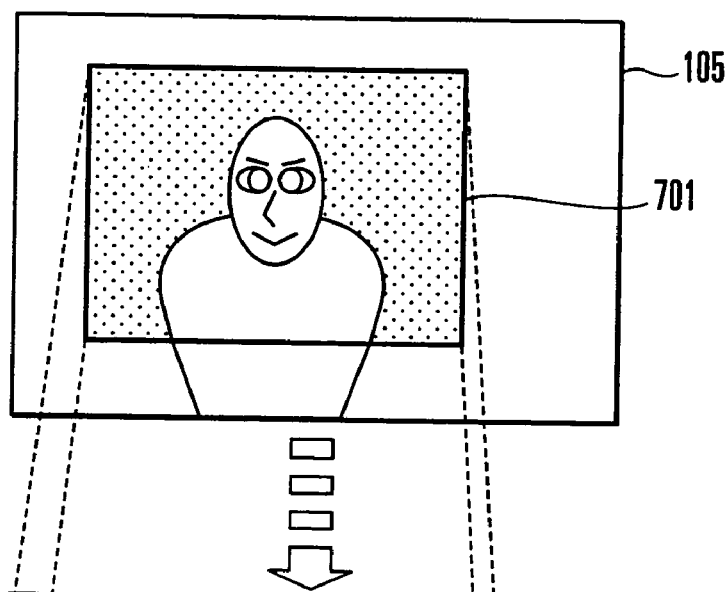
Figure 7B:
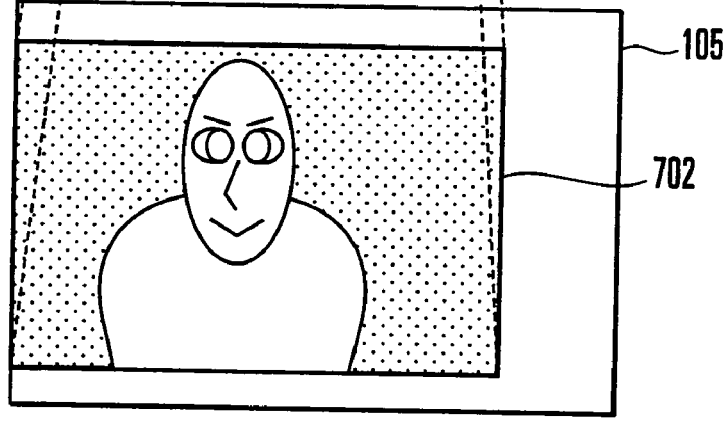

If the core area falls within the photographing range of the camera 103 but their edges do not overlap each other at any portion (YES in S503), the control unit 109 zooms in the camera until the edge of the photographing range of the camera 103 overlaps the edge of the core area (S504). Details of this state are shown in FIGS. 7A and 7B. FIGS. 7A and 7B show object images displayed on the liquid crystal screen 105 when an image photographed by the camera 103 is zoomed in. FIG. 7A shows an image before zoom-in, and FIG. 7B shows an image after zoom-in. Reference numerals 701 and 702 denote core areas. The control unit 109 zooms in the camera 103 so that the edge of the liquid crystal screen 105 that is photographed by the camera 103 overlaps the edge of the core area 702.

Figure 8A:
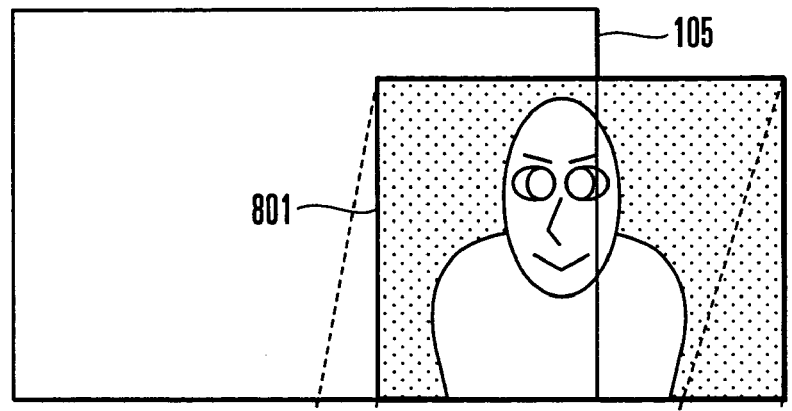
FIG. 8A is a view showing an object image displayed on the liquid crystal screen before an image photographed by the camera is zoomed out.
Figure 8B:
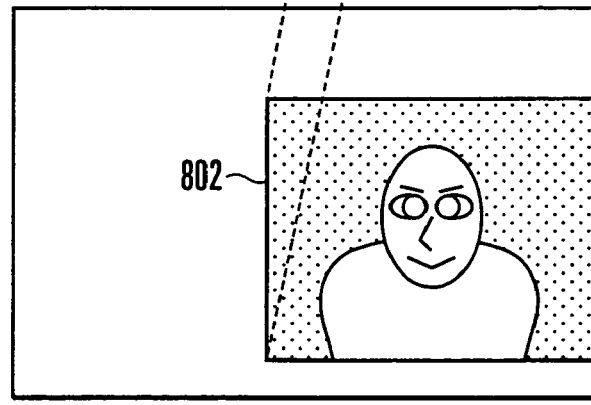
FIG. 8B is a view showing an object image displayed on the liquid crystal screen after the image photographed by the camera is zoomed out.

If the core area does not fall within the photographing range of the camera 103 (NO in S503), the control unit 109 zooms out the camera so that the core area outside the photographing range of the camera falls within the photographing range (S505). Details of this state are shown in FIGS. 8A and 8B. FIGS. 8A and 8B show object images displayed on the liquid crystal screen 105 when an image photographed by the camera 103 is zoomed out. FIG. 8A shows an image before zoom-out, and FIG. 8B shows an image after zoom-out. Reference numerals 801 and 802 denote core areas. The control unit 109 zooms out the camera 103 so that the core area 802 falls within the liquid crystal screen 105 and their edges overlap each other at one or more portions.

In S502, S504, and S505, the control unit 109 determines whether the ratio at which the core area occupies the photographing range of the camera 103 is proper (S506). For example, if the core area occupies 80% or more of the photographing range of the camera 103, the control unit 109 determines that the user's face can be input at a proper size.

If the control unit 109 determines that the ratio at which the core area occupies the photographing range of the camera 103 is not proper (NO in S506), the control unit 109 uses display on the liquid crystal screen 105, a sound output from the receiver 104, rumbling by vibrations of the motor 113, or the like, and notifies the user that the ratio is not proper (S507). The notification ends when the image state is properly changed, an arbitrary button of the input button group 101 is pressed, or a predetermined time is elapsed.

Figure 9C:
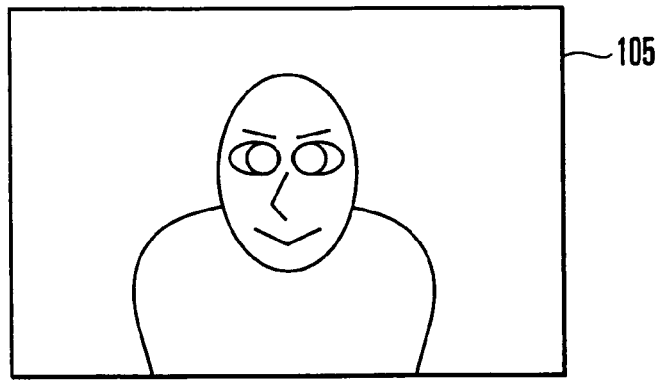
FIG. 9C is a view showing an image displayed on the liquid crystal screen of the partner's video phone.
Figures 9A, 9B:
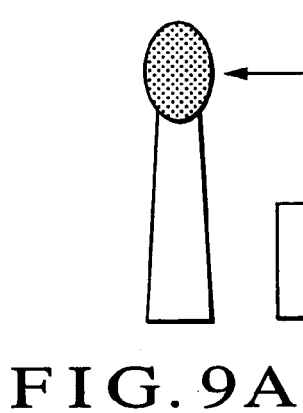
FIG. 9A is a view showing a state in which the user is close to the video phone.
FIG. 9B is a view showing a state in which the user is distant from the video phone.

Thereafter, camera photographing adjustment control is completed, and zoom adjustment for photographing a user's face at a proper size through the video phone ends. The result of zoom adjustment is shown in FIGS. 9A to 9C. FIG. 9A shows a state in which the user is close to the video phone, FIG. 9B shows a state in which the user is distant from the video phone, and FIG. 9C shows an image displayed on the liquid crystal screen 105 of the partner's video phone. As the distance changes, as shown in FIGS. 9A and 9B, the size of the displayed user's face changes in the prior art. In the embodiment, however, the user's face displayed on the liquid crystal screen 105 is maximum and appropriately displayed, as shown in FIG. 9C.

<Volume Adjustment Control>

Figure 10:
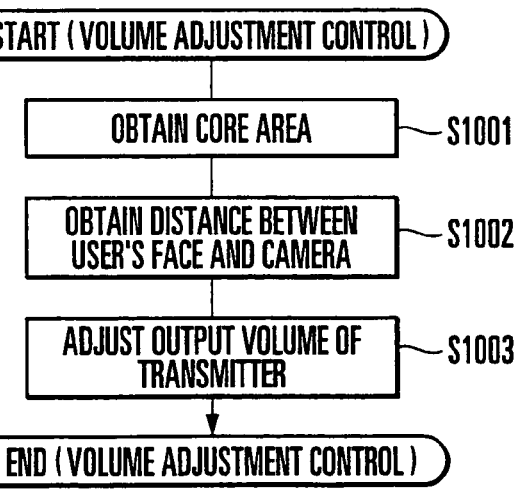
FIG. 10 is a flowchart showing volume adjustment control.

Detection process control in FIG. 3 includes "volume adjustment control". Volume adjustment control will be explained with reference to the flowchart of FIG. 10. Volume adjustment control is executed only when a face can be detected by automatic face detection control, and is not executed when no face can be detected.

The control unit 109 obtains a core area (S1001). A method of obtaining a core area is the same as that for "camera photographing adjustment control".

Figure 11A:
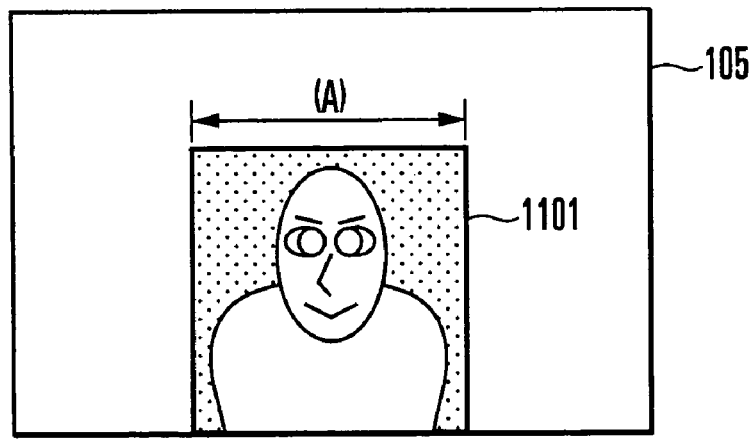
FIG. 11A is a view showing an image which is photographed by the camera and displayed on the liquid crystal screen.
Figure 11B:
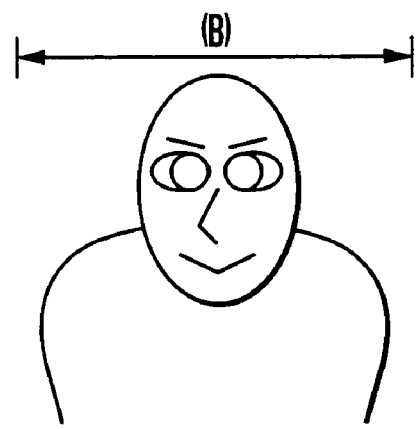
FIG. 11B is a view showing the image of an object (user) that is associated with the image shown in FIG. 11A.

The control unit 109 obtains the distance between the user's face and the camera (S1002). Details of this state are shown in FIGS. 11A and 11b. FIG. 11A shows an image which is photographed by the camera 103 and displayed on the liquid crystal screen 105. FIG. 11B shows the image of an object (user) that is associated with the photographed image. Reference numeral 1101 denotes a core area. Reference symbol (A) denotes the width of the core area; and (B), the actual distance of the width of the core area. The RAM 112 stores information on the average value of the actual distance of the width of the core area. For example, when the average value of the width of the face is 17.5 cm and a space of 7.5 cm is ensured, the average value of the actual distance of the width of the core area is 25 cm.

The control unit 109 obtains a rough distance between the user's face and the camera from the average value "25 cm" of the actual distance of the width of the core area that is stored in the RAM 112, in addition to the width (A) of the core area, the performance of the camera 103, and the zoom ratio (in this case, the distance is obtained using the width of the core area, but may be obtained using the length or area).

The control unit 109 checks "proper loudspeaker output volume information corresponding to the distance between the user's face and the camera" that is stored in the RAM 112, and adjusts the output volume of a sound from the receiver 104 (S1003).

Figures 12A, 12B, 12C:
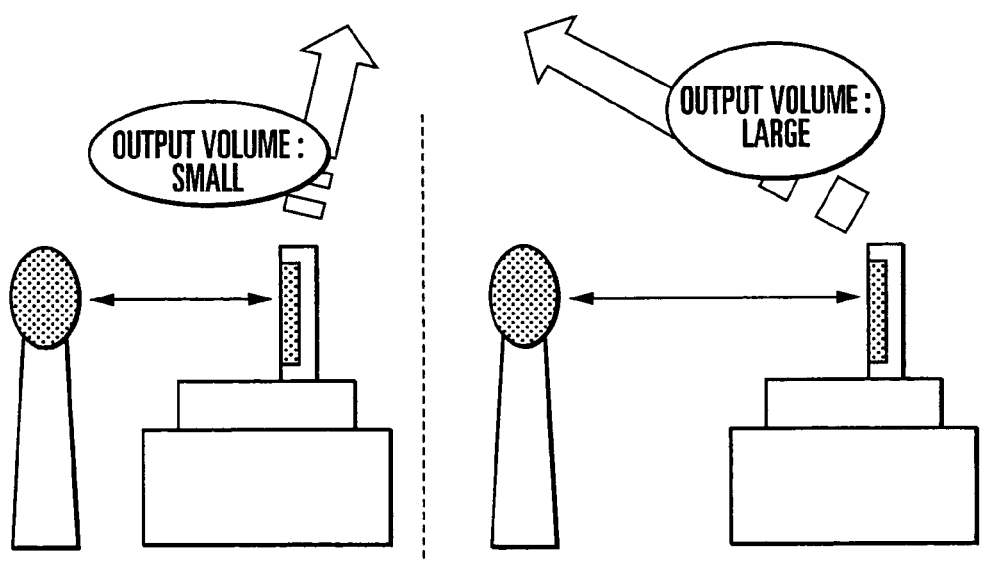
FIG. 12A is a view showing a state in which the user is close to the video phone.
FIG. 12B is a view showing a state in which the user is distant from the video phone.
FIG. 12C is a view showing an image displayed on the liquid crystal screen of the partner's video phone.

By the above process, volume adjustment control ends, and the user can listen to the partner's voice at an appropriate volume through the video phone regardless of the distance between the user and the terminal. The result of volume adjustment control is shown in FIGS. 12A to 12C. FIG. 12A shows a state in which the user is close to the video phone, FIG. 12B shows a state in which the user is distant from the video phone, and FIG. 12C shows an image displayed on the liquid crystal screen 105 of the partner's video phone. As the distance changes, as shown in FIGS. 12A and 12B, the volume of an output sound changes in the prior art. To the contrary, when the user's face is displayed on the liquid crystal screen 105, as shown in FIG. 12C, the output volume is changed depending on the distance. The volume is lowered for a shorter distance, and raised for a longer distance. The user can listen to the partner's voice at a proper volume regardless of the position within a predetermined range.

<Another Volume Adjustment Control>

Figure 13:
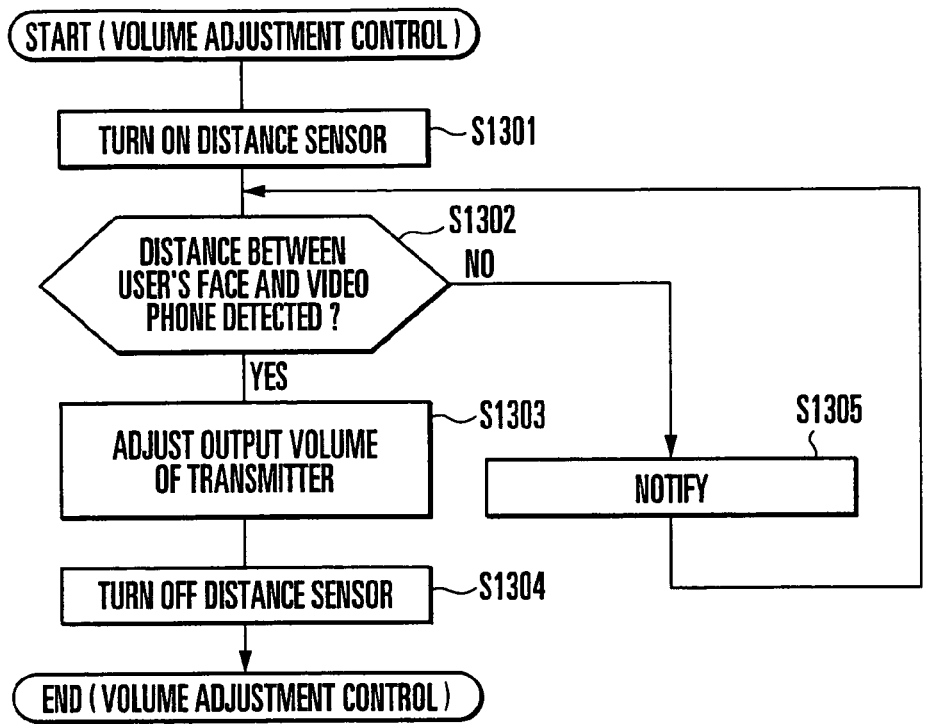
FIG. 13 is a flowchart showing another volume adjustment control.

Volume adjustment control is also achieved by another process operation using the function of the distance sensor 107. Another volume adjustment control will be explained with reference to the flowchart of FIG. 13.

The control unit 109 turns on the distance sensor 107 (S1301).

The distance sensor 107 detects the distance between the user's face and the terminal (S1302).

If the distance sensor 107 can detect the distance between the user's face and the terminal (YES in S1302), the control unit 109 checks "proper loudspeaker output volume information corresponding to the distance between the user's face and the terminal" that is stored in the RAM 112, and adjusts the output volume of a sound from the receiver 104 (S1303).

The control unit 109 then turns off the distance sensor 107 (S1304).

If the distance sensor 107 cannot detect any distance between the user's face and the terminal (NO in S1302), the control unit 109 uses the receiver 104 and notifies the user that no user's face can be detected (S1305). The notification ends when the image state is properly changed, an arbitrary button of the input button group 101 is pressed, or a predetermined time is elapsed. After the notification, the distance sensor 107 detects the distance again (S1302).

By the above process, volume adjustment control using the distance sensor 107 ends, and the user can listen to the partner's voice at an appropriate volume through the video phone regardless of the distance between the user and the terminal. The result of volume adjustment control is the same as that shown in FIGS. 12A to 12C.

<Automatic Irradiation Control>

Figure 14:
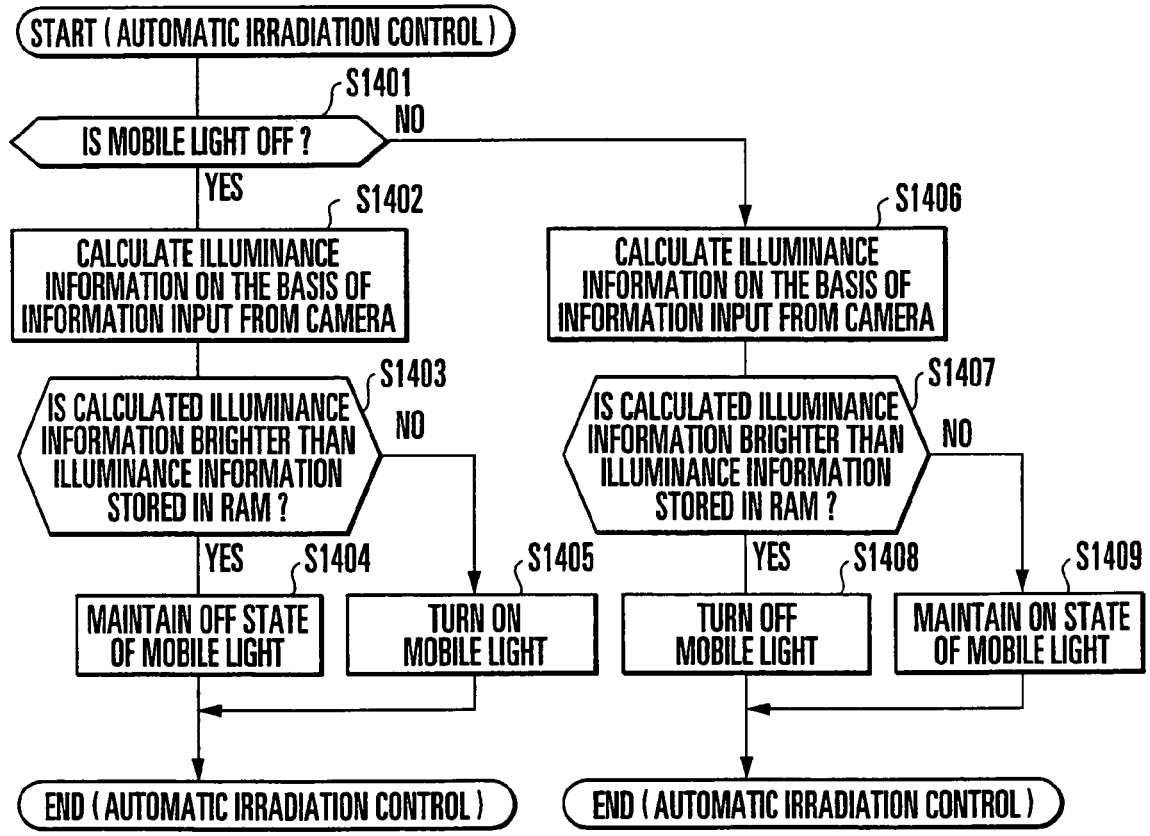
FIG. 14 is a flowchart showing automatic irradiation control.

Detection process control in FIG. 3 also includes "automatic irradiation control". Automatic irradiation control will be explained with reference to the flowchart of FIG. 14. Automatic irradiation control is executed only when a face can be detected by automatic face detection control, and is not executed when no face can be detected.

The control unit checks whether the mobile light 106 is OFF (S1401).

If the mobile light 106 is OFF (YES in S1401), the control unit 109 calculates illuminance information of the user's face on the basis of the face area of image information generated by the camera 103 (S1402). The control unit 109 checks whether the calculated illuminance information is brighter than illuminance information stored in the RAM 112 (S1403).

If the control unit 109 determines that the calculated illuminance information is brighter than the illuminance information stored in the RAM 112 (YES in S1403), the control unit 109 maintains the OFF state of the mobile light 106 (S1404).

If the control unit 109 determines that the calculated illuminance information is not brighter than the illuminance information stored in the RAM 112 (NO in S1403), the control unit 109 turns on the mobile light 106 (S1405).

If the mobile light 106 is not OFF (NO in S1401), the control unit 109 calculates illuminance information of the user's face on the basis of the face area of image information generated by the camera 103 (S1406). The control unit 109 checks whether the calculated illuminance information is brighter than illuminance information stored in the RAM 112 (S1407). At this time, the illuminance information stored in the RAM 112 is slightly higher than illuminance information which is stored in the RAM 112 and used in S1403. This setting gives hysteresis to the illuminance.

If the control unit 109 determines that the calculated illuminance information is brighter than the illuminance information stored in the RAM 112 (YES in S1407), the control unit 109 turns off the mobile light 106 (S1408).

If the control unit 109 determines that the calculated illuminance information is not brighter than the illuminance information stored in the RAM 112 (NO in S1407), the control unit 109 maintains the ON state of the mobile light 106 (S1409).

Accordingly, automatic irradiation control ends, and the user can transmit an image of a proper brightness to the partner's terminal through the video phone regardless of the environment. FIG. 15A shows the OFF state of the mobile light 106, and FIG. 15B shows the ON state of the mobile light 106. Illuminance information detected by the camera 103 is compared with that stored in the RAM 112, and the video phone is properly switched between the states of FIGS. 15A and 15B. A bright user's face can be displayed on the liquid crystal screen 105 of the partner's video phone.

<Another Automatic Irradiation Control>

Automatic irradiation control is also achieved by another process operation using the function of the illuminance sensor 108. This automatic irradiation control will be explained with reference to the flowchart of FIG. 16.

The control unit checks whether the mobile light 106 is OFF (S1601).

If the mobile light 106 is OFF (YES in S1601), the control unit 109 checks whether illuminance information input from the illuminance sensor 108 is brighter than illuminance information stored in the RAM 112 (S1602).

If the control unit 109 determines that the illuminance information input from the illuminance sensor 108 is brighter than the illuminance information stored in the RAM 112 (YES in S1602), the control unit 109 maintains the OFF state of the mobile light 106 (S1603).

If the control unit 109 determines that the illuminance information input from the illuminance sensor 108 is not brighter than the illuminance information stored in the RAM 112 (NO in S1602), the control unit 109 turns on the mobile light 106 (S1604).

If the mobile light 106 is not OFF (NO in S1601), the control unit 109 checks whether the illuminance information input from the illuminance sensor 108 is brighter than illuminance information stored in the RAM 112 (S1605). At this time, the illuminance information stored in the RAM 112 is slightly higher than illuminance information which is stored in the RAM 112 and used in S1602. This setting gives hysteresis to the illuminance.

If the control unit 109 determines that the illuminance information input from the illuminance sensor 108 is brighter than the illuminance information stored in the RAM 112 (YES in S1605), the control unit 109 turns off the mobile light 106 (S1606).

If the control unit 109 determines that the illuminance information input from the illuminance sensor 108 is not brighter than the illuminance information stored in the RAM 112 (NO in S1605), the control unit 109 maintains the ON state of the mobile light 106 (S1607).

After that, automatic irradiation control ends, and the user can transmit an image of a proper brightness to the partner's terminal through the video phone regardless of the environment. The OFF and ON states of the mobile light 106 are the same as those shown in FIGS. 15A and 15B. Illuminance information input from the illuminance sensor 108 is compared with that stored in the RAM 112, and the video phone is properly switched between the states of FIGS. 15A and 15B. A bright user's face can be displayed on the liquid crystal screen 105 of the partner's video phone.

A proper combination of some or all of process operations concerning the above-described control operations can provide appropriate display of the user's face, appropriate output of the volume, and appropriate lighting of the illumination.

As for the order of these control operations, it is preferable to first obtain a core area. Since control of obtaining a core area is executed by camera photographing adjustment control and volume adjustment control, either of the two control operations is first executed.

The video phone apparatus according to the embodiment adopts a setting window so as to allow the user to set detection control, and is so constituted as to perform transition to the setting window, storage of operation results on the setting window, and reflection of stored contents on operation. Examples are shown in FIGS. 17A and 17B.

Figure 17A:
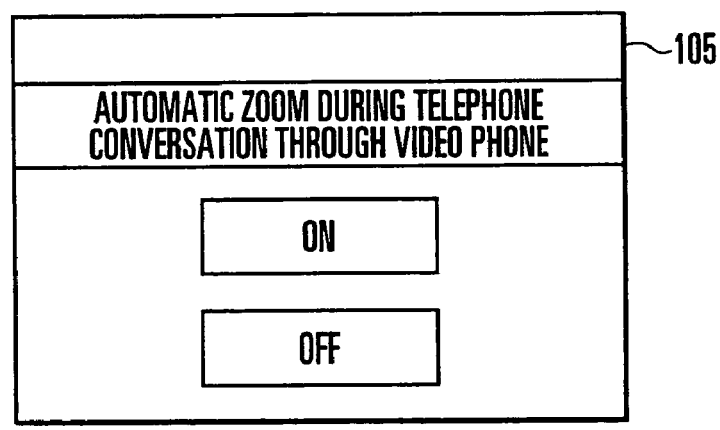
FIGS. 17A and 17B are views showing an example of the layout of the liquid crystal screen that is associated with a setting window capable of setting detection control.

FIG. 17A shows the liquid crystal screen 105 associated with an example of a display layout for setting operation of automatic face detection control. If the user sets "ON" in this state, automatic face detection control is executed in the use of the video phone; if the user sets "OFF", no automatic face detection control is executed.

Figure 17B:
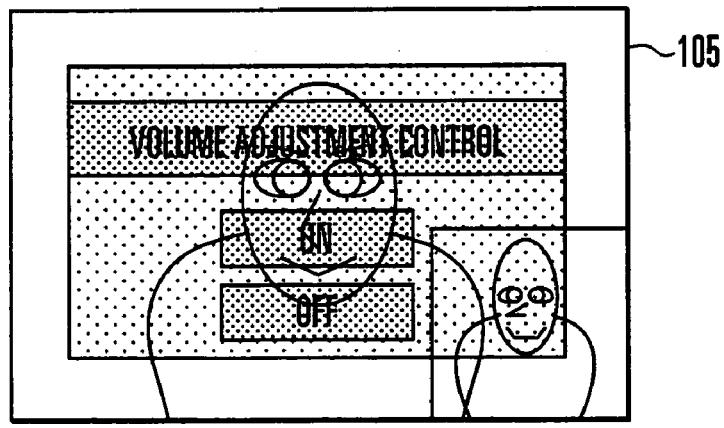

FIG. 17B shows the liquid crystal screen 105 associated with an example of a display layout for setting operation of volume adjustment control.

If the user sets "ON", volume adjustment control is executed in the use of the video phone; if the user sets "OFF", no volume adjustment control is executed.

These setting windows improve user friendliness in telephone conversation.

When the examples of the display layouts shown in FIGS. 17A and 17B are applied to all control operations, a setting of enabling/disabling all control operations at once, and a setting of simultaneously enabling/disabling not all but some of control operations can also be implemented.

<Function Units of Control Unit 109>

Figure 18:
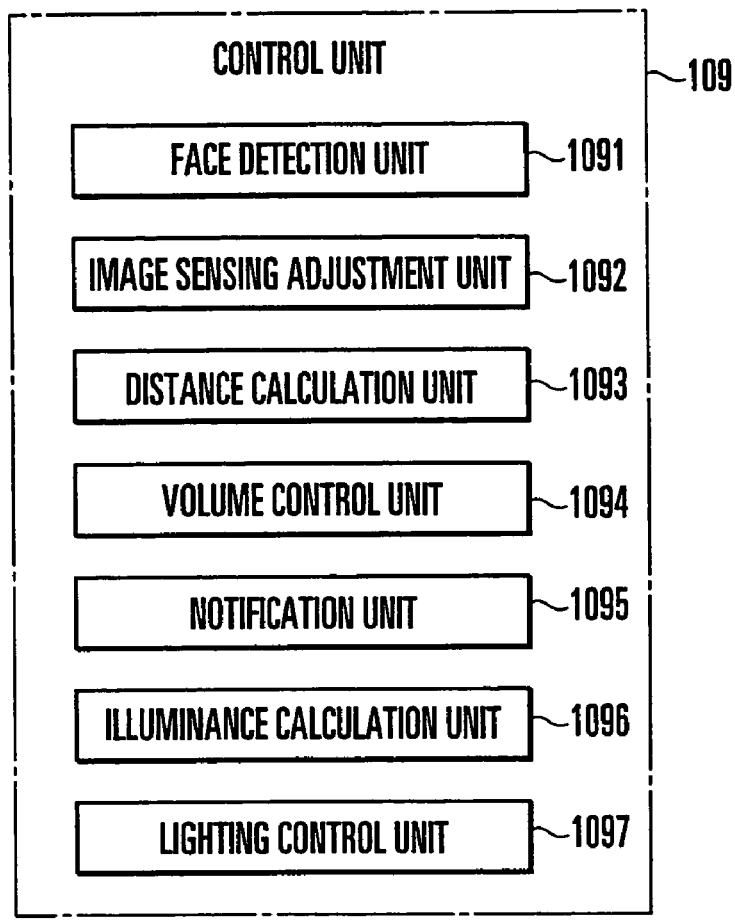
FIG. 18 is a block diagram showing function units implemented by a control unit.

Function units implemented when the control unit 109 executes the face detection program 111 stored in the ROM 110 will be explained with reference to FIG. 18.

The control unit 109 implements a face detection unit 1091, image sensing adjustment unit 1092, distance calculation unit 1093, volume control unit 1094, notification unit 1095, illuminance calculation unit 1096, and lighting control unit 1097.

The face detection unit 1091 detects a user's face from image information generated by the camera 103. More specifically, the face detection unit 1091 executes automatic face detection control in steps S401 to S408 shown in FIG. 4.

The image sensing adjustment unit 1092 sets a core area containing a face area in the image information generated by the camera 103. The image sensing adjustment unit 1092 controls the camera 103 to generate image information having undergone at least one of enlargement and reduction processes under a predetermined condition. More specifically, the image sensing adjustment unit 1092 executes camera photographing adjustment control in steps S501 to S506 shown in FIG. 5.

Figure 19:
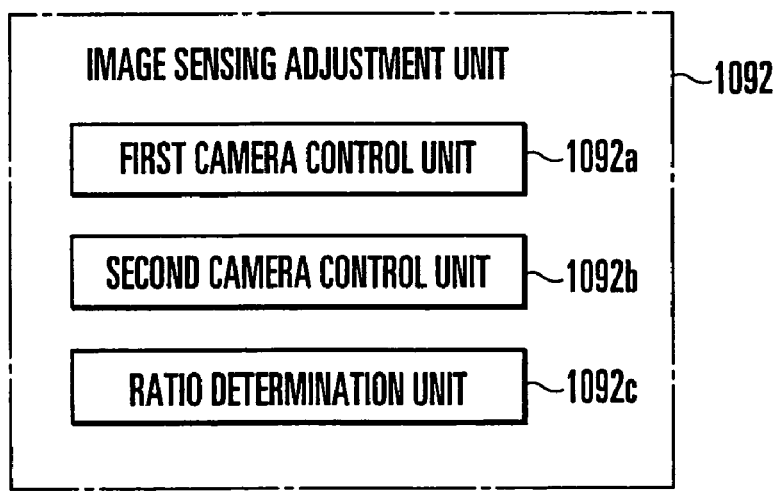
FIG. 19 is a block diagram showing the detailed configuration of an image sensing adjustment unit.

As shown in FIG. 19, the image sensing adjustment unit 1092 includes a first camera control unit (image sensing means control unit) 1092a, second camera control unit (image sensing means control unit) 1092b, and ratio determination unit (image sensing means control unit) 1092c. When the core area falls within the photographing range of the camera 103, the first camera control unit 1092a zooms in the camera 103 until the edge of the rectangular photographing range overlaps that of the rectangular core area. The first camera control unit 1092a then performs an enlargement process on the core area. More specifically, the first camera control unit 1092a executes step S504 shown in FIG. 5. When the core area does not fall within the photographing range of the camera 103, the second camera control unit 1092b zooms in the camera 103 until the core area outside the photographing range falls within the photographing range. The second camera control unit 1092b then performs a reduction process on the core area. More specifically, the second camera control unit 1092b executes step S505 shown in FIG. 5. The ratio determination unit 1092c determines whether a condition that the core area occupies at least a predetermined ratio of the photographing range of the camera 103 is satisfied. More specifically, the ratio determination unit 1092c executes step S506 shown in FIG. 5.

The distance calculation unit 1093 obtains the distance between the user's face, the video phone 100, and the user on the basis of the face area of the image information generated by the camera 103. More specifically, the distance calculation unit 1093 executes step S1002 shown in FIG. 10. The volume control unit 1094 controls the output volume of a sound from the receiver 104 on the basis of the distance obtained by the distance calculation unit 1093 or distance sensor 107. More specifically, the volume control unit 1094 executes step S1003 shown in FIG. 10 or step S1303 shown in FIG. 13.

Assume that the face detection unit 1091 cannot detect any face, that the ratio determination unit 1092c of the image sensing adjustment unit 1092 determines that the condition is not satisfied, and that the distance sensor 107 cannot detect any distance. In this case, the notification unit 1095 notifies the user that no face is detected, that no condition is satisfied, and that no distance is detected. More specifically, the notification unit 1095 executes step S409 shown in FIG. 4, step S507 shown in FIG. 5, and step S1305 shown in FIG. 13.

The illuminance calculation unit 1096 attains the illuminance of the user's face on the basis of the face area of the image information generated by the camera 103. More specifically, the illuminance calculation unit 1096 executes steps S1402 and S1406 shown in FIG. 14. The lighting control unit 1097 controls lighting of the mobile light 106 in correspondence with an illuminance attained by the illuminance calculation unit 1096 or illuminance sensor 108. More specifically, the lighting control unit 1097 executes steps S1403 to S1405 and S1407 to S1409 shown in FIG. 14 or steps S1602 to S1607 shown in FIG. 16.

Note that the above-described embodiment is the best mode for carrying out the invention, but the present invention is not limited to this. The present invention can be variously modified without departing from the scope of the invention.

For example, the liquid crystal screen 105 presents a guide display, but the display can be omitted or a dedicated operation unit can be adopted.

As has been described above, the present invention can properly display a user's face while suppressing a decrease in cost performance. Also, the present invention can suitably output the volume and turn on the illumination.

Demands arise for development of a mobile apparatus, stationary apparatus, and another communication apparatus having the video phone function according to the present invention.

What is claimed is:

1. A video phone comprising:
    image sensing means for sensing a face of a user serving as an object and generating image information, said image sensing means having an enlargement function and a reduction function for the object in an image sensing range;
    face detection means for detecting the face of the user from the image information generated by said image sensing means;
    image sensing adjustment means for setting, in the image information generated by said image sensing means, a core area which has redundancy and contains a face area serving as an area corresponding to the face detected by said face detection means, controlling said image sensing means, and generating image information by performing at least one of an enlargement process and a reduction process on the core area under a predetermined condition; and
    communication control means for transmitting the image information generated by said image sensing adjustment means to a communication partner.

2. A video phone according to claim 1, wherein said image sensing adjustment means comprises image sensing means control means for performing the enlargement process on the core area until an edge of the image sensing range overlaps an edge of the core area when the core area falls within the image sensing range of said image sensing means.

3. A video phone according to claim 1, wherein said image sensing adjustment means comprises image sensing means control means for performing the reduction process on the core area until the core area outside the image sensing range falls within the image sensing range when the core area does not fall within the image sensing range of said image sensing means.

4. A video phone according to claim 1, wherein said image sensing adjustment means comprises image sensing means control means for performing at least one of the enlargement process and the reduction process on the core area so as to make the core area occupy at least a predetermined ratio of the image sensing range of said image sensing means as the predetermined condition.

5. A video phone according to claim 1, further comprising input means for accepting an input for displaying an image based on the image information generated by said image sensing adjustment means.

6. A video phone according to claim 1, further comprising notification means for, when said face detection means does not detect any face and when said image sensing adjustment means performs control which does not satisfy the predetermined condition, notifying the user of one of a message that no face is detected and a message that no predetermined condition is satisfied.

7. A video phone according to claim 6, further comprising image display means for displaying an image based on image information,
   wherein said notification means uses an image display by said image display means, and notifies the user that no face is detected and that no predetermined condition is satisfied.

8. A video phone according to claim 6, further comprising audio output means for outputting a sound based on audio information,
   wherein said notification means uses a sound output from said audio output means, and notifies the user that no face is detected and that no predetermined condition is satisfied.

9. A video phone according to claim 6, further comprising vibration generation means for vibrating the video phone,
   wherein said notification means uses vibrations by said vibration generation means, and notifies the user that no face is detected and that no predetermined condition is satisfied.

10. A video phone according to claim 1, further comprising:
    audio output means for outputting a sound based on audio information;
    distance detection means for detecting a distance between the video phone and the user; and
    volume control means for controlling a volume of a sound output from said audio output means on the basis of the distance detected by said distance detection means.

11. A video phone according to claim 10, wherein said distance detection means includes distance calculation means for calculating the distance between the video phone and the user on the basis of the face area set by said image sensing adjustment means.

12. A video phone according to claim 10, further comprising input means for accepting an input for adjusting the volume of the sound output from said audio output means.

13. A video phone according to claim 10, further comprising notification means for, when said distance detection means does not detect any distance, notifying the user by using said audio output means that no distance is detected.

14. A video phone according to claim 1, further comprising:
    illumination means for illuminating the object;
    illuminance detection means for detecting an illuminance of the face of the user; and
    lighting control means for controlling lighting of said illumination means in correspondence with the illuminance detected by said illuminance detection means.

15. A video phone according to claim 14, wherein said illuminance detection means includes illuminance calculation means for calculating the illuminance of the face of the user on the basis of the face area of the image information generated by said image sensing means.

\* \* \* \* \*